United States Patent
Hayashi (10) Patent No.: US 8,429,380 B2
(45) Date of Patent: Apr. 23, 2013

(54) DISABLING REDUNDANT SUBFUNCTIONAL UNITS RECEIVING SAME INPUT VALUE AND OUTPUTTING SAME OUTPUT VALUE FOR THE DISABLED UNITS IN SIMD PROCESSOR

(75) Inventor: Hiroo Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 515 days.

(21) Appl. No.: 12/723,031

(22) Filed: Mar. 12, 2010

(65) Prior Publication Data
US 2011/0047349 A1 Feb. 24, 2011

(30) Foreign Application Priority Data
Aug. 18, 2009 (JP) .................. 2009-189249

(51) Int. Cl.
*G06F 15/80* (2006.01)
*G06F 1/32* (2006.01)
(52) U.S. Cl.
USPC ............................................ 712/22; 713/324
(58) Field of Classification Search .................. None
See application file for complete search history.

(56) References Cited

U.S. PATENT DOCUMENTS

| | | | |
|---|---|---|---|
| 4,843,540 A * | 6/1989 | Stolfo ........................... | 712/11 |
| 6,839,828 B2 | 1/2005 | Gschwind et al. | |
| 2006/0155964 A1 | 7/2006 | Totsuka | |
| 2006/0190700 A1 * | 8/2006 | Altman et al. ................. | 712/7 |
| 2006/0282646 A1 | 12/2006 | Dockser | |
| 2006/0282826 A1 | 12/2006 | Dockser | |

FOREIGN PATENT DOCUMENTS

JP 2000-293357 10/2000

OTHER PUBLICATIONS

Office Action issued Dec. 13, 2011, in Japanese Patent Application No. 2009-189249.
Yusuke Shimazaki, et al., "An Auto-Memoization Processor with Energy Control Technique", SACSIS 2008, Information Processing Society of Japan, vol. 2008, No. 5, Jun. 4, 2008, pp. 57-64 (with English Abstract).

\* cited by examiner

*Primary Examiner* — Kenneth Kim
(74) *Attorney, Agent, or Firm* — Oblon, Spivak, McClelland, Maier & Neustadt, L.L.P.

(57) ABSTRACT

A processor includes a plurality of subfunctional units provided corresponding to respective slots of one or more pieces of operation result data including a plurality of slots for an SIMD operation; and an enable generating unit configured to, in each of the one or more pieces of the operation result data, compare a value of a predetermined slot with a value of a slot other than the predetermined slot, and disable one or more subfunctional units to which the value equal to the value of the predetermined slot is inputted, and the processor outputs the value of the predetermined slot as the value of the one or more subfunctional units which have been disabled.

20 Claims, 5 Drawing Sheets

DISABLING REDUNDANT SUBFUNCTIONAL UNITS RECEIVING SAME INPUT VALUE AND OUTPUTTING SAME OUTPUT VALUE FOR THE DISABLED UNITS IN SIMD PROCESSOR

CROSS-REFERENCE TO RELATED APPLICATIONS

This application is based upon and claims the benefit of priority from the prior Japanese Patent Application No. 2009-189249 filed in Japan on Aug. 18, 2009; the entire contents of which are incorporated herein by reference.

BACKGROUND OF THE INVENTION

1. Field of the Invention

The present invention relates to a processor and a processor control method, and particularly to a processor having a plurality of subfunctional units configured to be able to execute SIMD operations, and a control method of the processor.

2. Description of the Related Art

Conventionally, there is a microprocessor of a scalar operation type. In a case of a normal microprocessor of the scalar operation type, in order to be able to execute SIMD operations, SIMD operation instructions are added so that the SIMD operations can be executed.

On the other hand, there is also a microprocessor which can execute only the SIMD operation instructions. In a case of such a microprocessor, execution of a scalar operation is performed by an SIMD operation instruction. However, when the scalar operation is executed by the SIMD operation instruction, unnecessary circuit elements also operate, and thus, there is a problem of unnecessary consumption of power.

Consequently, for example, U.S. Pat. No. 6,839,828 has proposed a technique of adding scalar operation instructions to a microprocessor which can execute only the SIMD operation instructions.

Alternatively, for example, U.S. Patent Application Publication No. 2006/0155964, U.S. Patent Application Publication No. 2006/0282646, or U.S. Patent Application Publication No. 2006/0282826 has proposed a technique of providing a mode switching function configured to switch an operation mode in the microprocessor.

However, if the scalar operation instruction is added to the microprocessor, the scalar operation instruction is defined and used in a limited instruction code system. Therefore, there are a problem of consumption of instruction codes and a problem in that software programs which have already been made cannot be taken care of.

Moreover, in order to switch between two modes of the scalar operation and the SIMD operation, there is a problem in that a mode switching instruction or a mode setting register has to be prepared or provided, and furthermore, mode information also needs to be saved when a context switch is done, and thus, an operating system (OS) also needs to be changed.

BRIEF SUMMARY OF THE INVENTION

According to an aspect of the present invention, there can be provided a processor, including a plurality of subfunctional units provided corresponding to respective slots of one or more pieces of operation result data including a plurality of slots for an SIMD operation; and a subfunctional unit controlling unit configured to, in each of the one or more pieces of the operation result data, compare a value of a predetermined slot with a value of a slot other than the predetermined slot, and disable one or more subfunctional units to which the value equal to the value of the predetermined slot is inputted, wherein the value of the predetermined slot is used as the value of the one or more subfunctional units which have been disabled.

DETAILED DESCRIPTION OF THE INVENTION

Hereinafter, an embodiment of the present invention will be described with reference to the drawings.

(Configuration)

Figure 1:
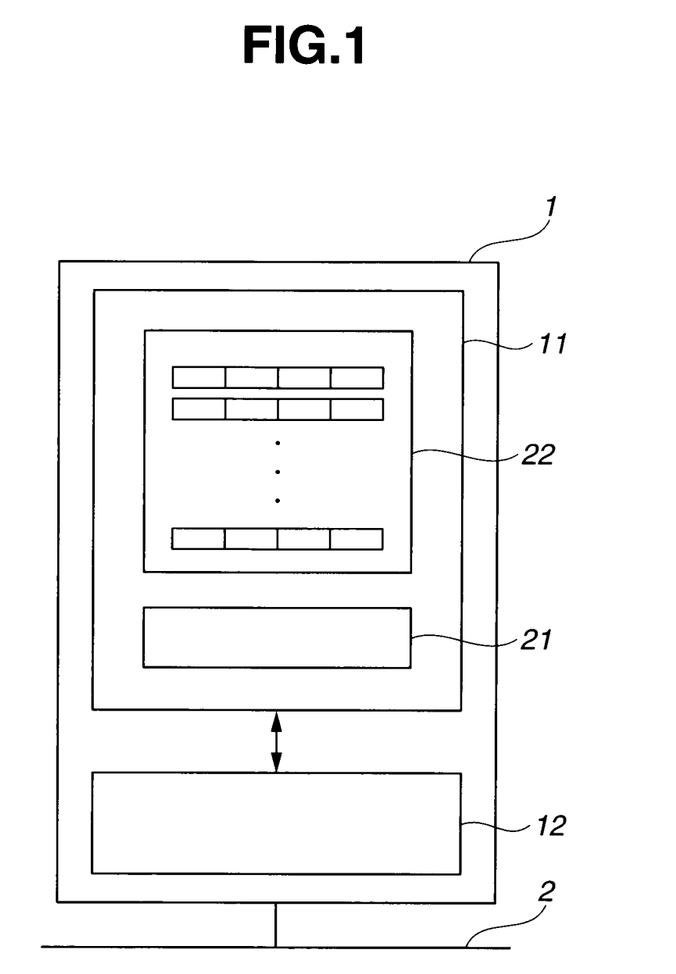
FIG. 1 is a block diagram for describing a configuration of a processor according to an embodiment of the present invention.

First, based on FIG. 1, a configuration of a processor according to the present embodiment will be described. FIG. 1 is a block diagram for describing the configuration of the processor according to the present embodiment.

As shown in FIG. 1, a processor 1 according to the present embodiment is a processor which is connected to a bus 2, includes an operating unit 11 and a local memory 12 as a storing unit, and has a plurality of subfunctional units for an SIMD operation. The operating unit 11 includes functional unit 21 and a register file 22 which is a group of general purpose registers. The processor 1 is connected to a ROM, a RAM and the like which are not shown, via the bus 2, reads instructions and data via the bus 2, and executes operations on data specified by instructions loaded from the local memory 12.

It should be noted that, in the present embodiment, while an example is described in which only one processor 1 is provided on a semiconductor chip and the processor 1 has the local memory 12, a plurality of the processors 1 may be provided on the semiconductor chip and connected to one another via the bus 2, or the processor 1 may not have the local memory 12.

Figure 2:
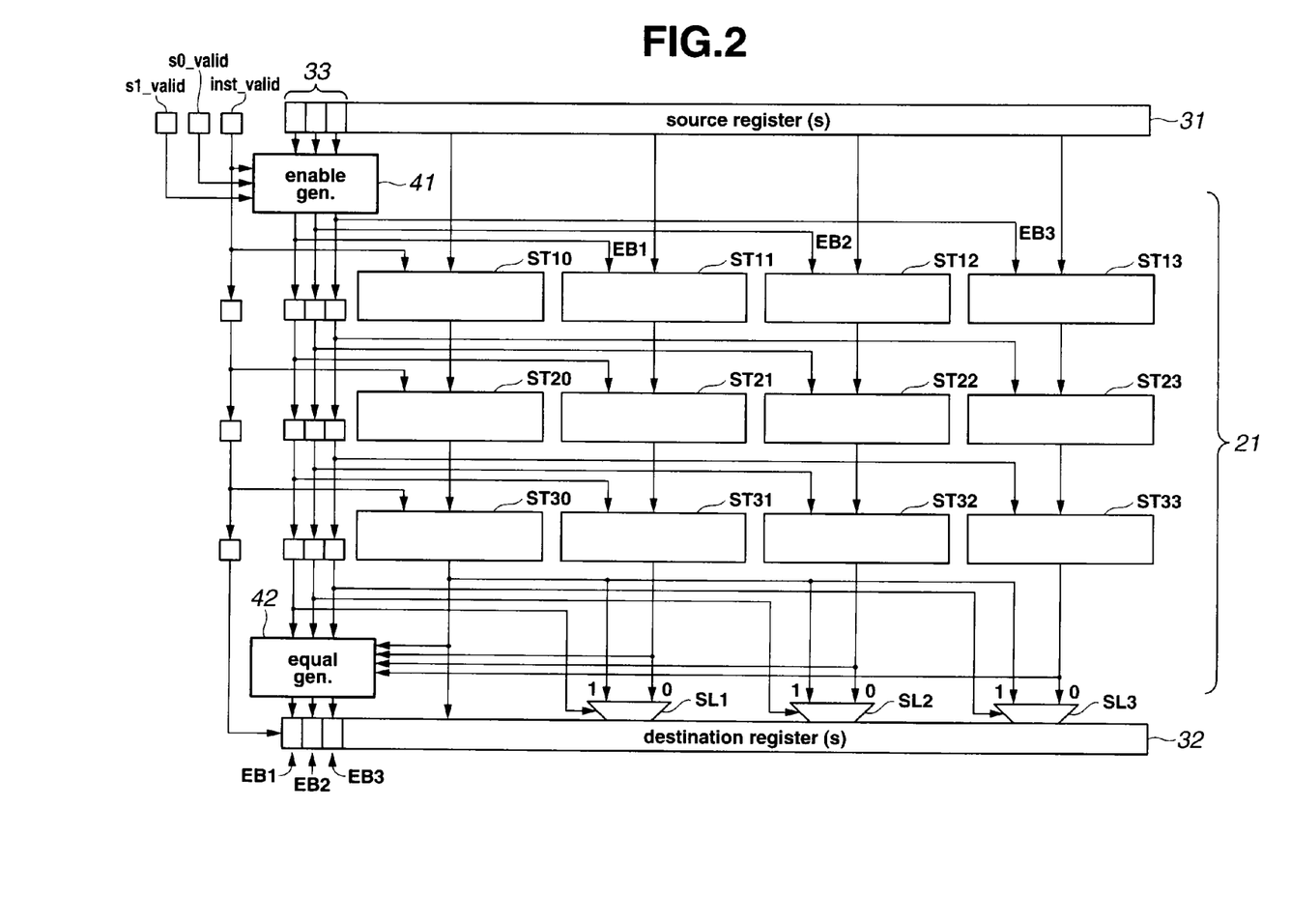
FIG. 2 is a block diagram for describing a configuration example of a functional unit 21 according to the embodiment of the present invention.

FIG. 2 is a block diagram for describing a configuration example of the functional unit 21. The functional unit 21 includes a plurality of subfunctional units ST10 to ST33 provided corresponding to respective slots of operation result data of an SIMD operation.

The functional unit 21 receives data of one or two or more source registers 31, which have been designated by an executed instruction, in the register file 22, and executes the predetermined operation based on the executed instruction via a predetermined number of pipelined stages (here, three stages). The functional unit 21 writes a result of the operation to one or two or more destination registers 32, which have been designated by the executed instruction, in the register file 22. Both the operation source data and the operation result data are stored in the register file 22.

Based on the executed instruction, it is designated whether or not each subfunctional unit in each stage is set to be valid, and the operation for each slot in the source register 31 is executed.

In the present embodiment, the operation data size of the SIMD operation is 128 bits, and an example of the operation data including four slots each of which has 32 bit data will be described. For example, in a case of a register file of 128 bit width, the functional unit 21 may be not only 32 bits×4, but also an SIMD functional unit of 64 bits×2 or the like, and furthermore, may be a functional unit of different bit width such as 16 bits×8.

To the functional unit 21, the data of the source register 31 of a register number designated in the executed instruction is inputted. Four subfunctional units in each stage are provided corresponding to the respective SIMD operation slots, and data from a corresponding slot is inputted to each subfunctional unit. Moreover, each subfunctional unit is a functional unit which can be disabled, that is, a functional unit in which the execution of the operation can be stopped.

The data of the four slots in 128 bits is inputted to the four subfunctional units ST10 to ST13 in a stage 1, respectively. The data of a first slot (hereinafter, also referred to as "preferred slot") in 128 bits is inputted to the subfunctional unit ST10. The data of a second slot, a third slot and a fourth slot are inputted to the subfunctional unit ST11, the subfunctional unit ST12 and the subfunctional unit ST13, respectively.

Operation results of the four subfunctional units ST10 to ST13 in the stage 1 are inputted to the four subfunctional units ST20 to ST23 in a next stage 2, respectively. Similarly, operation results of the four subfunctional units ST20 to ST23 in the stage 2 are inputted to the four subfunctional units ST30 to ST33 in a next stage 3, respectively.

An operation result of the subfunctional unit ST30 in the stage 3 is written as data of a first slot in the destination register 32 designated by the executed instruction. Operation results of the subfunctional units ST31 to ST33 in the stage 3 are written to second to fourth slots of the destination register 32, via selectors SL1 to SL3, respectively.

Moreover, data of data comparison result registers 33 to be described later is also inputted to the functional unit 21. The data comparison result registers 33 are, here, registers configured to retain 3 bit data as three pieces of comparison result data for each of register in the register file 22, and are a part of the register file 22.

It should be noted that, in the present embodiment, while the data comparison result registers 33 are provided corresponding to each register as a part of the register file 22, the data comparison result registers 33 may be provided separately from the register file 22.

Each data of the data comparison result registers 33 corresponding to the source register 31 is supplied to an enable generating unit (enable gen.) 41.

The enable generating unit 41 supplies the comparison data as a disable signal to a disable terminal of the subfunctional unit to be disabled.

First comparison data EB1 from the enable generating unit 41 is supplied to the disable terminal of the subfunctional unit ST11 in the stage 1. Second comparison data EB2 is supplied to the disable terminal of the subfunctional unit ST12 in the stage 1. Third comparison data EB3 is supplied to the subfunctional unit ST13 in the stage 1.

Moreover, the comparison data from the enable generating unit 41 is also supplied to second, third and fourth subfunctional units in each stage.

Furthermore, an instruction valid bit IV (inst_valid) indicating that the instruction is valid is supplied to the disable terminals of the subfunctional units ST10, ST20 and ST30 in the respective stages. The instruction valid bit IV is a bit indicating that a valid instruction has been supplied in that cycle. Therefore, when the instruction valid bit IV indicates "valid", the operation in each stage is executed.

Each output of the second to fourth subfunctional units ST31 to ST33 in the stage 3 is supplied to one input terminal of each of the selectors SL1 to SL3. Moreover, an output of a first subfunctional unit ST30 (that is, the preferred slot) in the stage 3 is supplied to the first slot of the destination register 32, and also to the other input terminal of each of the selectors SL1 to SL3.

Furthermore, the first comparison data EB1 outputted from the enable generating unit 41 is supplied as a select signal to the selector SL1. The selector SL1 selects and outputs any one of two pieces of input data depending on a value of the first comparison data EB1. The second and third comparison data EB2 and EB3 outputted from the enable generating unit 41 are also supplied as the select signals to the selectors SL2 and SL3, respectively. Each of the selectors SL2 and SL3 selects and outputs any one of two pieces of input data depending on a value of each of the second and third comparison data EB2 and EB3.

If the value of inputted comparison data is "1", each selector selects the output of the preferred slot, and outputs the output of the preferred slot to a corresponding slot of the destination register 32. Moreover, if the value of the inputted comparison data is "0", each selector selects the output of the subfunctional unit which has been inputted, and outputs the output of the subfunctional unit to the corresponding slot of the destination register 32.

Figure 3:
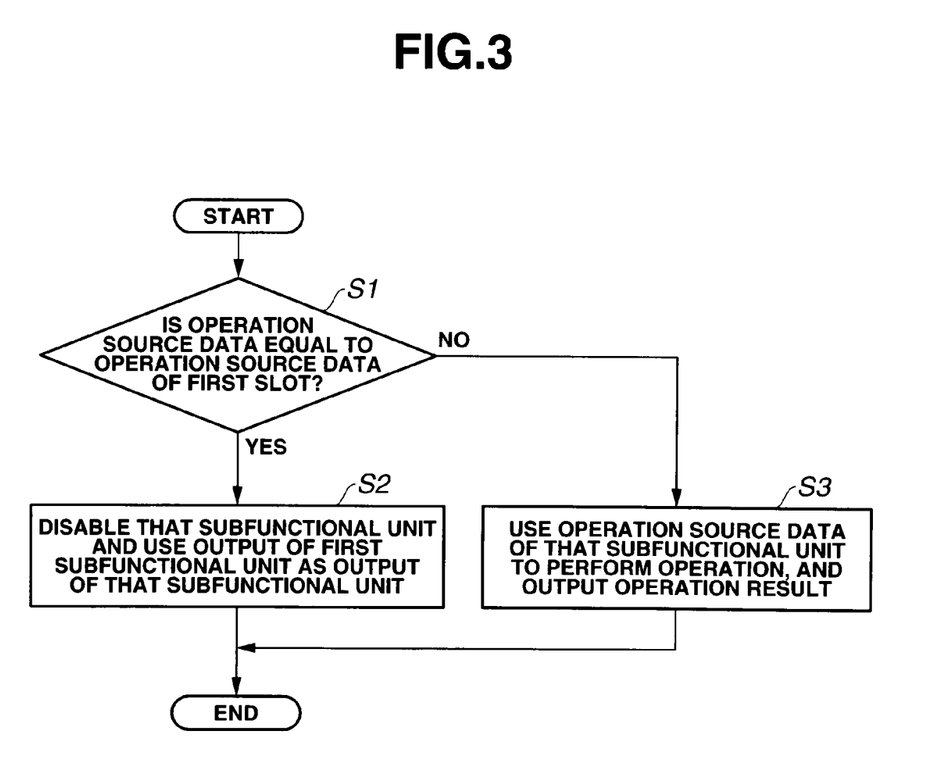
FIG. 3 is a flowchart showing a process for determining a subfunctional unit to be disabled.

FIG. 3 is a flowchart showing a process for determining the subfunctional unit to be disabled. In FIG. 3, a comparison is performed to determine whether or not the operation source data of each subfunctional unit is equal to the operation source data of the first slot (S1). If the operation source data of each subfunctional unit is equal to the operation source data of the first slot (S1, YES), that subfunctional unit is disabled, and the output of the first subfunctional unit is used as the output of that subfunctional unit (S2). If the operation source data of each subfunctional unit is not equal to the operation source data of the first slot (S1, NO), the operation source data of that subfunctional unit is used to perform the operation, and the operation result is outputted (S3).

The data of the data comparison result registers 33, and the data of the first to fourth subfunctional units ST30 to ST33 in the stage 3 are inputted to an equal generating unit (equal gen.) 42 as a comparison data storing unit.

The equal generating unit 42 compares the output data of the first subfunctional unit ST30 with each output data of the second to fourth slots in the stage 3. If the data of the first slot and the data of the other slots are the same, here, the equal generating unit 42 sets the comparison data of the data comparison result registers 33 corresponding to the destination register 32 to "1". Each of the first to third comparison data EB1 to EB3 generated by the equal generating unit 42 is comparison data indicating whether or not each output of the second to fourth subfunctional units is equal to a value of the preferred slot. The equal generating unit 42 stores the comparison data in the register file 22 in a manner corresponding to the operation result data of the functional unit 21.

For example, when the preferred slot and the second slot have the same data, the first comparison data EB1 is set to "1", and when the preferred slot and the second slot do not have the same data, the first comparison data EB1 is set to "0". When the preferred slot and the third slot have the same data, the second comparison data EB2 is set to "1", and when the preferred slot and the third slot do not have the same data, the second comparison data EB2 is set to "0". In addition, when the preferred slot and the fourth slot have the same data, the third comparison data EB3 is set to "1", and when the preferred slot and the fourth slot do not have the same data, the third comparison data EB3 is set to "0". The comparison data is stored in some registers in the register file 22.

Figure 4:
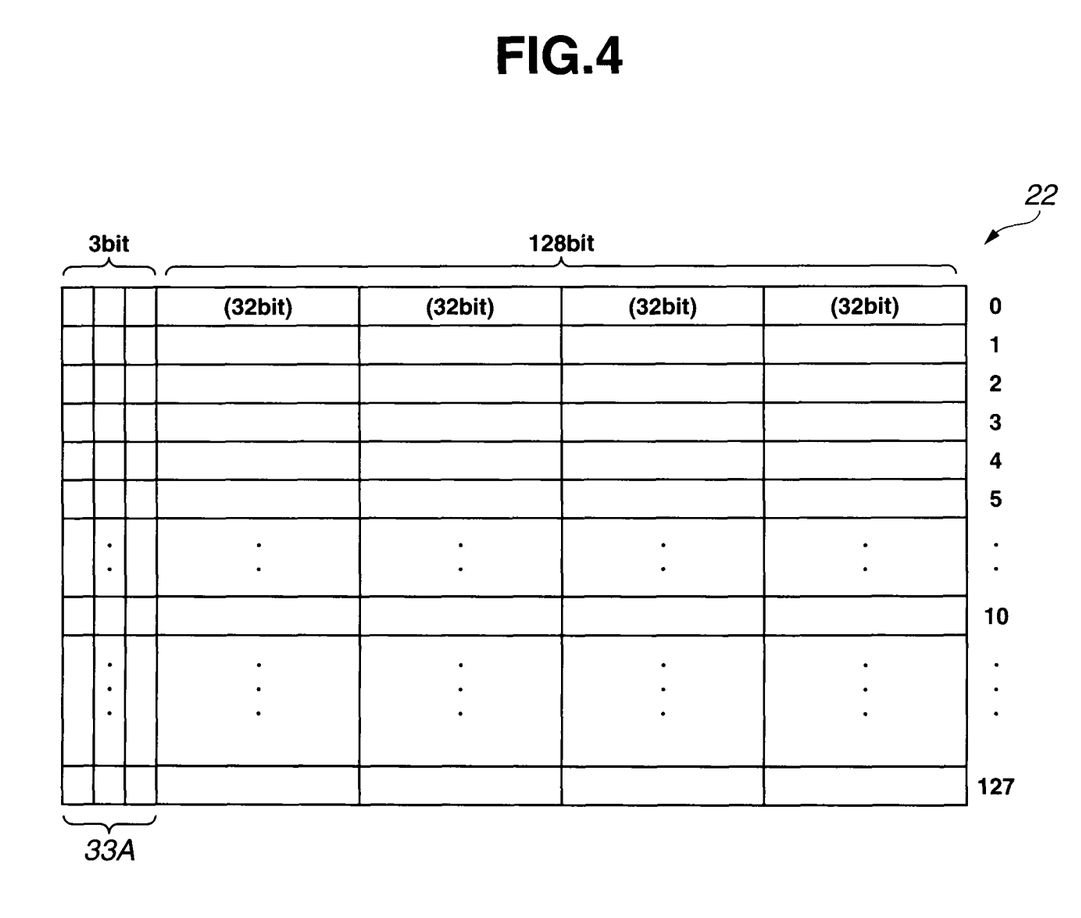
FIG. 4 is a diagram for describing a configuration of a register file 22 according to the embodiment of the present invention.

FIG. 4 is a diagram for describing a configuration of the register file 22. As shown in FIG. 4, the register file 22 includes 128 registers (register numbers 0 to 127) each of which can store 128 bit data. Furthermore, the register file 22 has a data comparison result register group 33A which can store the comparison data corresponding to each register.

The register file 22 is used, for example, so that a predetermined SIMD operation is executed with the data of the registers of the register numbers 1 and 5 as the input, and the operation result data of the SIMD operation is stored in the register of the register number 10. Alternatively, the register file 22 is used so that the predetermined SIMD operation is executed with the data of the register number 1 as the input, and the operation result of the SIMD operation is stored in the register number 10. As described above, each register in the register file 22 stores the operation source data of the SIMD operation, and stores the result data of the operation thereof. Which register (one or more registers) is set as an input data register, and which register is set as an output data register are designated by a executed instruction.

Moreover, the register file 22 is a register group having a plurality of the data comparison result register groups 33A which are configured to store the comparison data corresponding to a plurality of registers configured to store the operation source data and the operation result data.

(Operations of Enable Generating Unit 41 when Data is Read from Register File 22)

When an operation is performed in the functional unit 21, for example, two register numbers are designated as the source registers. The enable generating unit 41 sets the second to fourth subfunctional units to be valid (enabled) or invalid (disabled). The enable generating unit 41 configures a subfunctional unit controlling unit, and can supply the disable signal to the subfunctional units to be disabled.

Here, for example, a case where data of two source registers 31 (rs0 and rs1) in the register file 22 is inputted to the enable generating unit 41, and the predetermined operation is performed in the functional unit 21 will be described by way of example.

In the case of the example, the enable generating unit 41 is configured with a logic circuit configured to execute contents of following expressions.

When the data of the register numbers 0 and 1 which are the two source registers rs0 and rs1 is read and the operation is executed, each of the first to fourth subfunctional units is enabled or disabled. Whether to enable or disable is represented in the following expressions. In the following expressions, inst_valid indicates that the valid instruction has been supplied in that cycle. s0_valid indicates that, as a result of decoding the valid instruction, the instruction is an instruction using the register rs0 as the source register, and s1_valid indicates that, as the result of decoding the valid instruction, the instruction is an instruction using the register rs1 as the source register, respectively.

slot0:enable[0]:=inst_valid;            Expression (1)

slot1:enable[1]:=inst_valid AND((s0_valid AND!s10eqs11[rs0])OR(s1_valid AND!s10eqs11[rs1]));            Expression (2)

slot2:enable[2]:=inst_valid AND((s0_valid AND!s10eqs12[rs0])OR(s1_valid AND!s10eqs12[rs1]));            Expression (3)

slot3:enable[3]:=inst_valid AND((s0_valid AND!s10eqs13[rs0])OR(s1_valid AND!s10eqs13[rs1]));            Expression (4)

In other words, Expression (1) indicates that the first subfunctional units (that is, the functional units of the preferred slots) ST10, ST20 and ST30 are enabled if the instruction is the valid instruction, and are disabled when the instruction is invalid.

Expression (2) indicates that if the instruction is valid (inst_valid), and furthermore, if the source register rs0 is used and the data of the first slot does not match the data of the second slot (s0_valid AND !s10eqs11[rs0]), or if the source register rs1 is used and the data of the first slot does not match the data of the second slot (s1_valid AND !s10eqs11[rs1]), the second subfunctional unit ST11 is enabled, and otherwise the second subfunctional unit ST11 is disabled.

Expression (3) indicates that if the instruction is valid (inst_valid), and furthermore, if the source register rs0 is used and the data of the first slot does not match the data of the third slot (s0_valid AND !s10eqs12[rs0]), or if the source register rs1 is used and the data of the first slot does not match the data of the third slot (s1_valid AND !s10eqs12[rs1]), the third subfunctional unit ST12 is enabled, and otherwise the third subfunctional unit ST12 is disabled.

Expression (4) indicates that if the instruction is valid (inst_valid), and furthermore, if the source register rs0 is used and the data of the first slot does not match the data of the fourth slot (s0_valid AND !s10eqs13[rs0]), or if the source register rs1 is used and the data of the first slot does not match the data of the fourth slot (s1_valid AND !s10eqs13[rs1]), the fourth subfunctional unit ST13 is enabled, and otherwise the fourth subfunctional unit ST13 is disabled.

While the above is the example in which the instruction is an instruction for two pieces of source data (2-operand instruction), the instruction may be an instruction for one piece of the source data. Furthermore, the instruction may be an instruction for three pieces of the source data (3-operand instruction), and in that case, in Expressions (2) to (4), terms of a condition "OR (s2_valid AND !s10eqs1x[rs2])" (here, x is any of 1, 2 and 3) are added.

It should be noted that, since the source registers to be used for the operation are designated in the executed instruction, portions of the register numbers in the above described expressions vary depending on the instruction.

Enable signals (enable[0:3]) to the four subfunctional units ST10 to ST13 in the stage 1 are supplied along with the operation of the instruction through each stage of a pipelining unit. As a method of disabling each subfunctional unit, the disablement is performed by using a publicly known technical approach such as a clock gating technique, and as a result, power consumption is reduced.

For example, as a method of disabling the subfunctional unit, there is a method of stopping supply of a clock to the subfunctional unit to be disabled, or a method of fixing data to be inputted to each subfunctional unit, or the like.

(Operations of Equal Generating Unit 42 When Data Comparison Result is Recorded)

When the equal generating unit 42 as the comparison data storing unit writes the operation result data of the SIMD operation to the destination register 32, the equal generating unit 42 also writes and stores the comparison data in the corresponding data comparison result registers 33. In other words, data comparison results of the respective slots are recorded in the data comparison result registers 33.

The comparison data EB1 to EB3 of the data comparison result registers 33 are data indicating whether or not the data of second to fourth slots SL1 to SL3 matches the data of the preferred slot.

The equal generating unit 42 is configured with a logic circuit configured to execute contents of following expressions.

As shown in Expression (5) as follows, the register number of the destination register 32 is rd, the data of the first to fourth slots are slot0 to slot3, and the comparison data EB1 to EB3 of the destination register rd are s10eqs11[rd], s10eqs12[rd] and s10eqs13[rd], respectively. The comparison data EB1 to EB3 of the destination register rd are recorded as indicated by Expressions (6) to (8) as follows, respectively. Each of enable[1], enable[2] and enable[3] is the signal in which the output of the enable generating unit 41 is supplied along with the operation of the instruction through each stage of the pipelining unit, and indicates that the subfunctional unit is enabled (valid). Each of !enable[1], !enable[2] and !enable[3] indicates that the subfunctional unit is disabled (the operation is stopped).

register_file[rd]:={slot0,slot1,slot2,slot3};   Expression (5)

s10eqs11[rd]:=((slot0==slot1)AND enable[1])OR!enable[1];   Expression (6)

s10eqs12[rd]:=((slot0==slot2)AND enable[2])OR!enable[2];   Expression (7)

s10eqs13[rd]:=((slot0==slot3)AND enable[3])OR!enable[3];   Expression (8)

Here, Expression (6) means that if the data of the first slot (the preferred slot) is equal to the data of the second slot when the second subfunctional unit is valid ((slot0==slot1) AND enable[1]), or if the second subfunctional unit is disabled (invalid) (!enable[1]), s10eqs11[rd] (that is, the comparison data EB1 of the destination register rd) is set to "1". Otherwise the comparison data EB1 is set to "0". Expressions (7) and (8) also have a similar meaning.

In other words, when the equal generating unit 42 stores the operation result data of the functional unit 21 for the SIMD operation in the register file 22, the equal generating unit 42 records the comparison data of "1" when a value of each slot matches the value of the preferred slot, or "0" when the value of each slot does not match the value of the preferred slot, along with the data of each slot.

It should be noted that while the comparison of the data of each slot can also be performed when the data is read from the register file 22, degradation in performance occurs due to circuit delay. Thus, here, the comparison of the data of each slot is performed when the operation result data is written to the register file 22, because there is a relatively large margin for the circuit delay then.

As described above, the equal generating unit 42 compares the output of the subfunctional unit corresponding to the preferred slot with the output of the subfunctional unit corresponding to the slot other than the preferred slot, and stores the comparison data indicating that the value of the slot other than the preferred slot is the same as (or different from) the value of the preferred slot, in a manner corresponding to the operation result data.

Furthermore, the equal generating unit 42 regards the value of the slot corresponding to the disabled subfunctional unit, as the same as the value of the preferred slot, and stores the comparison data in a manner corresponding to the operation result data. In other words, also if a subfunctional unit is disabled (the operation is stopped) (!enable[1],[2],[3]), the comparison data corresponding to the subfunctional unit is set to "1".

When the operation result data is written back to the register file 22, that is, when the operation result data is outputted to the register file 22, since the data of the disabled subfunctional unit is equal to the data of the first slot (the preferred slot), the data of the first slot is written as output data of the disabled subfunctional unit. In other words, the data of the destination register 32 is as shown in following expressions.

register_file[rd].slot0:=slot0;   Expression (9)

register_file[rd].slot1:=enable[1]?slot1:slot0;   Expression (10)

register_file[rd].slot2:=enable[2]?slot2:slot0;   Expression (11)

register_file[rd].slot3:=enable[3]?slot3:slot0;   Expression (12)

The process is executed by using each value of the data comparison result registers 33 as a selection signal of a corresponding selector. As shown in FIG. 2, for example, when the comparison data EB1 is "1" (that is, the second subfunctional unit is disabled), the value of the preferred slot is selected and outputted. Moreover, when the comparison data EB1 is "0" (that is, the second subfunctional unit is enabled), the output of the second subfunctional unit is selected and written back.

In other words, the value of the preferred slot is used as the outputs of one or two or more disabled subfunctional units.

As described above, according to the above described processor 1, when an SIMD operation configured to perform operations of a plurality of pieces of element data in parallel is executed, if input data of one element is the same as input data of the other element, the subfunctional unit is disabled for the one element (that is, the operation is not performed by the subfunctional unit), and instead, a result of the other element with the same input data is used. Thereby, lower power consumption of the processor 1 is realized.

Moreover, in the above described processor 1, when a scalar operation is performed, only the preferred slot is used to perform the operation. If the same data as the data of a preferred slot SL0 is stored to the second to fourth slots at a time of a scalar operation instruction, when the scalar operation is executed in the above described processor 1, the execution can also be performed with low power consumption. Conventionally, since an instruction configured to write the same data to the other register exists in the instructions, the scalar operation can also be easily executed in the above described processor 1 by using such an instruction.

(Variation)

In the above described example, when the operation result is written back to the register file 22, for the slot having the same data as the data of the first slot, the data of the first slot is selected, outputted and written back to the register file 22.

Figure 5:
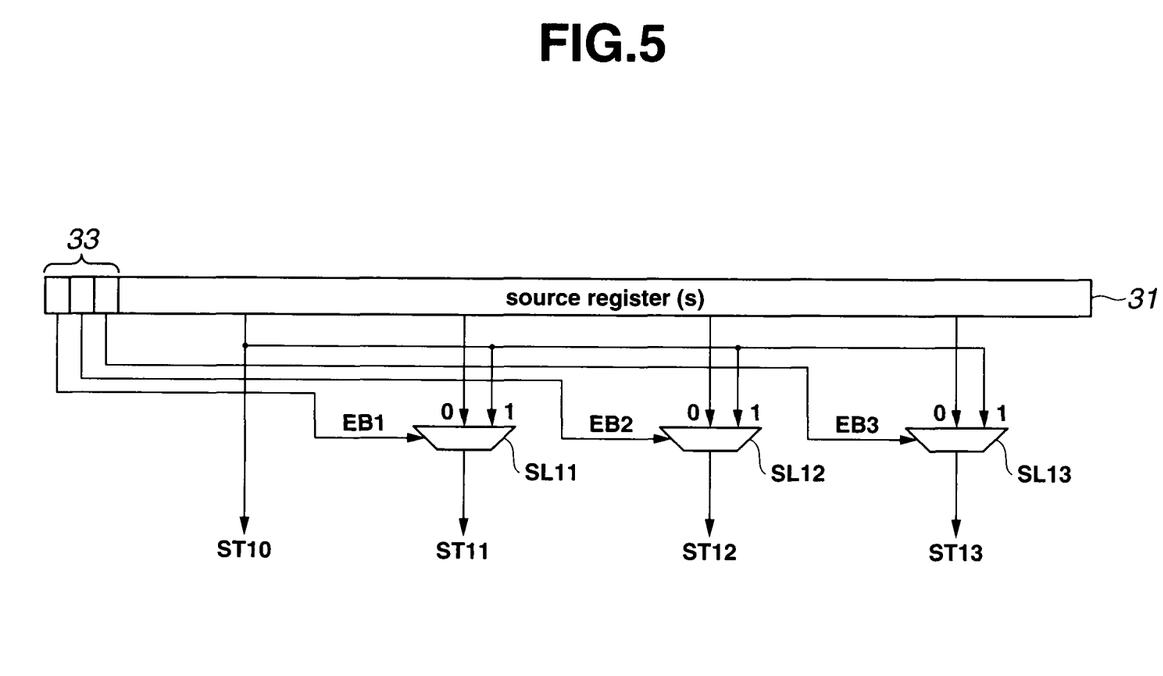
FIG. 5 is a diagram for describing a circuit according to a variation of the embodiment of the present invention.

In the variation, in a case of the same data, instead of selecting and writing the data of the first slot when the write back to the register file is performed, the data of the first slot is provided to the subfunctional unit based on the comparison data when the data is read from the register file 22.

FIG. 5 is a diagram for describing a circuit according to the variation. Three selectors SL11, SL12 and SL13 are provided in a data inputting unit of the functional unit 21. In four pieces of slot data of the source register 31, the data of the first slot is directly supplied to the subfunctional unit ST10. Each data of the second, third and fourth slots is supplied to one input terminal of each of the selectors SL11, SL12 and SL13. The data of the first slot is supplied to the other input terminal of each of the selectors SL11, SL12 and SL13. The comparison data EB1, EB2 and EB3 of the data comparison result registers 33 are supplied to the selectors SL11, SL12 and SL13, respectively.

It should be noted that the same number of selector groups including the selectors SL11, SL12 and SL13, as the number of the source registers which can be designated by the instruction, are provided.

Depending on each bit of the comparison data of the source register 31 which has been read, the processor according to the variation operates so that the second to fourth subfunctional units ST11, ST12 and ST13 select the data of the preferred slot or corresponding slot data.

When the comparison data EB1 is "1", since the data of the preferred slot matches the data of the second slot, the selector SL11 selects the data of the preferred slot and supplies the data to the subfunctional unit ST11. When the comparison data EB1 is "0", since the data of the preferred slot does not match the data of the second slot, the selector SL11 selects the data of the second slot and supplies the data to the subfunctional unit ST11.

As described above, in the present variation, when the data is written back to the register file 22, the same data as the data of the preferred slot don't have to be written, and when the data is read from the register file 22, the data of the preferred slot is selected and supplied to the subfunctional unit.

As described above, according to the processor according to the above described embodiment and variation, the SIMD operation can be executed in which the scalar operation can also be executed with low power consumption without adding any instruction to an instruction code system, and also without any need for mode switching or the like.

It should be noted that, in the above described example, while the example of the comparison between the preferred slot and the other slots has been described, a predetermined slot as a comparison target slot may be a slot other than the preferred slot.

Furthermore, the comparison target slot may not be only one slot, and for example, a comparison among all the slots may be performed.

The present invention is not limited to the above described embodiment, and various modifications, alterations and the like can be made in a range not changing the gist of the present invention.

What is claimed is:

1. A processor, comprising:
a plurality of subfunctional units provided corresponding to respective slots of one or more pieces of operation source data including a plurality of slots for an SIMD operation; and
a subfunctional unit controlling unit configured to, in each of the one or more pieces of the operation source data, compare a value of a predetermined slot with a value of a slot other than the predetermined slot in the plurality of slots, and disable one or more subfunctional units to which the value equal to the value of the predetermined slot is inputted,
wherein output of the subfunctional unit corresponding to the predetermined slot is outputted as output of the one or more subfunctional units which have been disabled.

2. The processor according to claim 1, wherein
in each of the one or more pieces of the operation source data, based on comparison data indicating whether or not the value of the slot other than the predetermined slot is equal to the value of the predetermined slot, the subfunctional unit controlling unit disables the one or more subfunctional units to which the value equal to the value of the predetermined slot is inputted.

3. The processor according to claim 2, further comprising:
a comparison data storing unit configured to compare an output of the subfunctional unit corresponding to the predetermined slot with an output of the subfunctional unit corresponding to the slot other than the predetermined slot, and store the comparison data indicating that the value of the slot other than the predetermined slot is the same as or different from the value of the predetermined slot, in a manner corresponding to operation result data.

4. The processor according to claim 3, wherein
the comparison data storing unit regards the values of the slots corresponding to the one or more subfunctional units which have been disabled, as the same as the value of the predetermined slot, and stores the comparison data in a manner corresponding to the operation result data.

5. The processor according to claim 3, wherein
the comparison data is stored in some registers in a register file configured to store the one or more pieces of the operation source data and the operation result data.

6. The processor according to claim 1, wherein
if the one or more pieces of the operation source data include a plurality of pieces of the operation source data, the subfunctional unit controlling unit disables the one or more subfunctional units when the value of the predetermined slot is equal to the values of the one or more subfunctional units, in all the plurality of pieces of the operation source data.

7. The processor according to claim 1, wherein
the output of the subfunctional unit corresponding to the predetermined slot is outputted as the output of the one or more subfunctional units which have been disabled, when operation result data generated by the plurality of subfunctional units is outputted to a register file.

8. The processor according to claim 1, wherein
the predetermined slot is a preferred slot.

9. The processor according to claim 1, wherein
the predetermined slot is a slot other than the preferred slot.

10. The processor according to claim 1, wherein
the disablement of the one or more subfunctional units is performed by stopping supply of a clock to the subfunctional unit to be disabled.

11. The processor according to claim 1, wherein
the disablement of the one or more subfunctional units is performed by fixing data to be inputted to the subfunctional unit to be disabled.

12. A processor, comprising:
a plurality of subfunctional units provided corresponding to respective slots of one or more pieces of operation source data including a plurality of slots for an SIMD operation;
a register file configured to store the one or more pieces of the operation source data, and comparison data indicating whether or not a value of a predetermined slot in the plurality of slots is equal to a value of a slot other than the predetermined slot, for each piece of the operation source data; and
a subfunctional unit controlling unit configured to, in each of the one or more pieces of the operation source data, compare the value of the predetermined slot with the value of the slot other than the predetermined slot in the plurality of slots, and disable one or more subfunctional units to which the value equal to the value of the predetermined slot is inputted, wherein output of the subfunctional unit corresponding to the predetermined slot is outputted as output of the one or more subfunctional units which have been disabled.

13. The processor according to claim 12, wherein
based on the comparison data corresponding to the one or more pieces of the operation source data, the subfunctional unit controlling unit disables the one or more subfunctional units to which the value equal to the value of the predetermined slot is inputted.

14. The processor according to claim 13, further comprising:
a comparison data storing unit configured to compare an output of the subfunctional unit corresponding to the predetermined slot with an output of the subfunctional unit corresponding to the slot other than the predetermined slot, and store the comparison data indicating that the value of the slot other than the predetermined slot is the same as or different from the value of the predetermined slot, in a manner corresponding to operation result data.

15. The processor according to claim 14, wherein
the comparison data storing unit regards the values of the slots corresponding to the one or more subfunctional units which have been disabled, as the same as the value of the predetermined slot, and stores the comparison data in a manner corresponding to the operation result data.

16. The processor according to claim 12, wherein
if the one or more pieces of the operation source data include a plurality of pieces of the operation source data, the subfunctional unit controlling unit disables the one or more subfunctional units when the value of the predetermined slot is equal to the values of the one or more subfunctional units, in all the plurality of pieces of the operation source data.

17. The processor according to claim 12, wherein
the output of the subfunctional unit corresponding to the predetermined slot is outputted as the output of the one or more subfunctional units which have been disabled, when operation result data generated by the plurality of subfunctional units is outputted to the register file.

18. The processor according to claim 12, wherein
the predetermined slot is a preferred slot.

19. The processor according to claim 12, wherein
the predetermined slot is a slot other than the preferred slot.

20. A control method for a processor including a plurality of subfunctional units provided corresponding to respective slots of one or more pieces of operation source data including a plurality of slots for an SIMD operation, and a subfunctional unit controlling unit, the control method comprising:
in each of the one or more pieces of the operation source data, comparing a value of a predetermined slot with a value of a slot other than the predetermined slot in the plurality of slots by the subfunctional unit controlling unit; and
disabling one or more subfunctional units to which the value equal to the value of the predetermined slot is inputted, and outputting output of the subfunctional unit corresponding to the predetermined slot as output of the one or more subfunctional units which have been disabled, by the subfunctional unit controlling unit.

* * * * *